United States Patent
Hua et al.

(10) Patent No.: US 9,866,356 B2
(45) Date of Patent: Jan. 9, 2018

(54) DATA DISTRIBUTION METHOD AND DEVICE

(71) Applicant: ZTE Corporation, Shenzhen, Guangdong (CN)

(72) Inventors: Xueqin Hua, Shenzhen (CN); Jun Huang, Shenzhen (CN); Zhixiong Zhou, Shenzhen (CN); Zhuo Cui, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 63 days.

(21) Appl. No.: 14/414,783

(22) PCT Filed: Jun. 13, 2013

(86) PCT No.: PCT/CN2013/077205
§ 371 (c)(1),
(2) Date: Jan. 14, 2015

(87) PCT Pub. No.: WO2014/023127
PCT Pub. Date: Feb. 13, 2014

(65) Prior Publication Data
US 2015/0207598 A1    Jul. 23, 2015

(30) Foreign Application Priority Data
Aug. 7, 2012 (CN) .......................... 2012 1 0278753

(51) Int. Cl.
*G06F 15/16* (2006.01)
*H04L 5/00* (2006.01)
(Continued)

(52) U.S. Cl.
CPC ...... *H04L 5/0037* (2013.01); *G06F 17/30899* (2013.01); *H04L 67/02* (2013.01);
(Continued)

(58) Field of Classification Search
CPC ..... H04L 69/04; H04L 67/02; H04L 67/2823; H04L 69/22; H04L 67/2828; H04L 29/06;
(Continued)

(56) References Cited

U.S. PATENT DOCUMENTS

2002/0056010 A1 * 5/2002 Lincoln ................... H04L 12/24
                                                            709/247
2004/0215665 A1   10/2004 Edgar
(Continued)

FOREIGN PATENT DOCUMENTS

| CN | 1997030 A   | 7/2007  |
| CN | 101291324 A | 10/2008 |

(Continued)

OTHER PUBLICATIONS

International Search Report in international application No. PCT/CN2013/077205, dated Sep. 26, 2013.
(Continued)

*Primary Examiner* — Djenane Bayard
(74) *Attorney, Agent, or Firm* — Oppedahl Patent Law Firm LLC (57) ABSTRACT

A data distribution method and a data distribution device are described. The method includes parsing a GTPU message from a user terminal to obtain a Hyper Text Transport Protocol (HTTP) request message for requesting a resource, and determining whether the data request mode of the HTTP request message is an HTTP compression mode; when the determination result is that it is an HTTP compression mode, directly sending the HTTP request message to a server; otherwise, setting the data request mode of the HTTP request message as an HTTP compression mode and then sending the message to the server; setting the data format of an HTTP response message sent by the server as a data format fitting the data request mode of the HTTP request message
(Continued)

and sending the response message to the user terminal. In this way, the consumption of backhaul bandwidth and the consumption of air interface bandwidth can be reduced significantly.

6 Claims, 4 Drawing Sheets

(51) Int. Cl.
*H04L 29/08* (2006.01)
*H04L 29/06* (2006.01)
*H04W 4/18* (2009.01)
*G06F 17/30* (2006.01)

(52) U.S. Cl.
CPC .......... *H04L 67/2823* (2013.01); *H04L 69/04* (2013.01); *H04W 4/18* (2013.01)

(58) Field of Classification Search
CPC ... H04L 69/08; H04L 41/509; H04L 41/0813; H04L 41/0823; H04L 43/08; H04L 65/4084; H04L 41/0803; H04L 67/1095; H04L 5/0037; G06F 17/30899; G06F 17/30
See application file for complete search history.

(56) References Cited

U.S. PATENT DOCUMENTS

| | | | |
|---|---|---|---|
| 2008/0171537 A1* | 7/2008 | Chiu | ............... H04L 67/2823 455/412.2 |
| 2011/0231577 A1 | 9/2011 | Rezaiifar | |
| 2011/0251994 A1* | 10/2011 | Yang | ...................... H03M 7/30 707/620 |
| 2012/0198032 A1 | 8/2012 | Fitzgerald | |

FOREIGN PATENT DOCUMENTS

| | | |
|---|---|---|
| CN | 101370014 A | 2/2009 |
| CN | 102075570 A | 5/2011 |
| CN | 102420872 A | 4/2012 |
| CN | 102612825 A | 7/2012 |
| JP | 2008251031 | 10/2008 |
| JP | 2012508475 | 4/2012 |
| WO | 02098108 A1 | 12/2002 |
| WO | 2006115962 A2 | 11/2006 |

OTHER PUBLICATIONS

English Translation of the Written Opinion of the International Search Authority in international application No. PCT/CN2013/077205, dated Sep. 26, 2013.
Supplementary European Search Report in European application No. 13827488.1, dated Jun. 16, 2015.

* cited by examiner

DATA DISTRIBUTION METHOD AND DEVICE

TECHNICAL FIELD

The disclosure relates to a data distribution method and a data distribution device based on HTTP compression.

BACKGROUND

With the rapid development of mobile internet and smart phones, surfing the internet using a mobile phone has gradually become a popular way, and subsequently a problem is that double increase in traffic is caused to a base station. When multiple pieces of User Equipment (UE, which refers to a smart phone in following text) access a base station simultaneously to browse the web, the consumption of bandwidth of an air interface is great.

Figure 1:
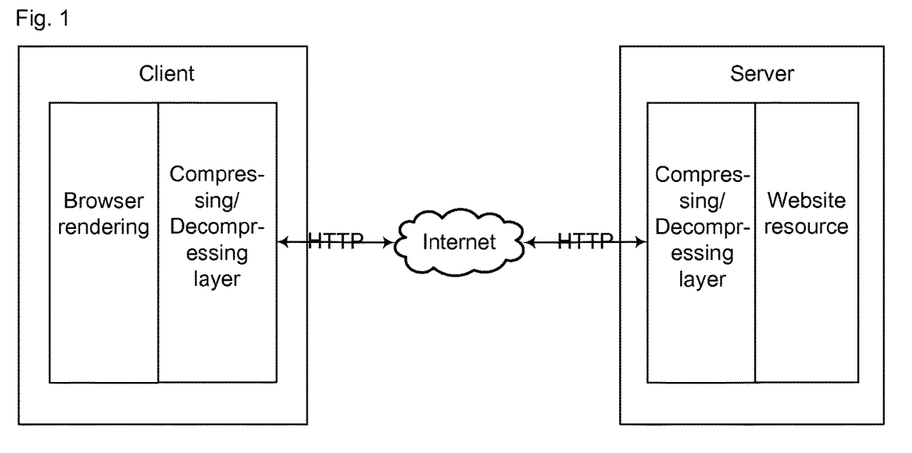
FIG. 1 shows a diagram of a data request mode in commercial internet provided by existing technologies.

In existing commercial internet, a Hyper Text Transport Protocol (HTTP) is employed to perform communication between a client and a server. As shown in FIG. 1, in order to reduce the pressure of traffic in a network, an HTTP compression technology is adopted. When a browser requests a resource, the browser submits supportable compression formats to a server through an attribute field in the HTTP header, then, the server compresses the required content using a compression algorithm supported by the browser and then sends the content to the browser, and finally the browser decompresses the content and shows to a user. Of course, a great amount of compression computation performed in the server will inevitably consume CPU and thereby affects efficiency; this problem can be resolved by an intermediate server and no further description is needed here.

In existing base station systems, when a resource request from UE arrives at a base station through an air interface, the base station is just responsible for passing through this request to a core network and acquiring data from the core network and then transparently transmitting the data to the UE. During this process, the base station does nothing to the request from the UE; the request mode of the UE might be a compression mode or not; the data returned by the core network might be compressed or not. For the request and the returned data in a non-compression mode, the consumption of air interface bandwidth and backhaul bandwidth is greatly high.

SUMMARY

The embodiments of the disclosure provide a data distribution method and a data distribution device, which can reduce the consumption of air interface bandwidth and backhaul bandwidth when UE requests data in a non-compression mode.

According to one aspect of the embodiments of the disclosure, a data distribution method is provided, including:

parsing a GPRS Tunnelling Protocol User Plane (GTPU) message from a user terminal to obtain an HTTP request message for requesting a resource, and determining whether a data request mode of the HTTP request message is an HTTP compression mode;

when a determination result is that it is an HTTP compression mode, directly sending the HTTP request message to a server; otherwise, setting the data request mode of the HTTP request message as an HTTP compression mode and then sending the HTTP request message to the server; and

2 setting a data format of an HTTP response message sent by the server as a data format fitting the data request mode of the HTTP request message and sending the HTTP response message to the user terminal.

In an embodiment, the method includes determining whether the data request mode of the HTTP request message is an HTTP compression mode according to the data request mode obtained by parsing the HTTP request message.

In an embodiment, the method includes, when it is determined that the data request mode of the HTTP request message is not an HTTP compression mode, adding a compression attribute to the header of the HTTP request message and sending the HTTP request message to the server via a core network.

In an embodiment, the method includes, if the data format of the HTTP response message sent by the server is an HTTP non-compression mode while the data request mode of the HTTP request message is an HTTP compression mode, extracting the response data from the HTTP response message, compressing the response data and then adding the compressed response data to a new HTTP response message to send to the user terminal.

In an embodiment, the method includes, if the data format of the HTTP response message sent by the server is an HTTP compression mode while the data request mode of the HTTP request message is an HTTP non-compression mode, extracting response data from the HTTP response message, decompressing the response data and then adding the decompressed response data to a new HTTP response message to send to the user terminal.

In an embodiment, the method includes, if the data format of the HTTP response message sent by the server is an HTTP compression mode and the data request mode of the HTTP request message is an HTTP compression mode, directly sending the HTTP response message to the user terminal.

In an embodiment, the method includes, if the data format of the HTTP response message sent by the server is an HTTP non-compression mode and the data request mode of the HTTP request message is an HTTP non-compression mode, directly sending the HTTP response message to the user terminal.

According to another aspect of the embodiments of the disclosure, a data distribution device is provided, including:

an uplink data parsing module, which is configured to receive from a user terminal an HTTP request message for requesting a resource;

a proxy request module, which is configured to determine whether a data request mode of the HTTP request message is an HTTP compression mode; if it is determined that the data request mode of the HTTP request message is an HTTP compression mode, directly send the HTTP request message to a server; otherwise, modify the data request mode of the HTTP request message to be an HTTP compression mode and send the HTTP request message to the server via a core network;

a downlink data paring module, which is configured to receive an HTTP response message sent by the server to respond to the HTTP request message; and a proxy response module, which is configured to set a data format of the HTTP response message as a data format fitting the data request mode of the HTTP request message;

In an embodiment, the proxy response module is configured to, if the data request mode of the HTTP request message is an HTTP compression mode while the data format of the HTTP response message is an HTTP non-compression mode, extract response data from the HTTP response message, compress the response data and then add the compressed response data to a new HTTP response message to send to the user terminal.

In an embodiment, the proxy response module is configured to, if the data request mode of the HTTP request message is an HTTP non-compression mode while the data format of the HTTP response message is an HTTP compression mode, extract response data from the HTTP response message, decompress the response data and then add the decompressed response data to a new HTTP response message to send to the user terminal.

Compared with existing technologies, the embodiments of the disclosure have advantages as follows:

1. When the data request mode of UE is an HTTP non-compression mode, a base station or a base station controller will process data by an HTTP compression mode forcedly, and a server returns compressed data, thus the consumption of backhaul bandwidth is significantly reduced;

2. When the data request mode of a UE is an HTTP compression mode and when a server returns uncompressed data, a base station or a base station controller compresses the data and then sends the compressed data to the UE, thus the consumption of air interface bandwidth is significantly reduced.

DETAILED DESCRIPTION

Figure 2:
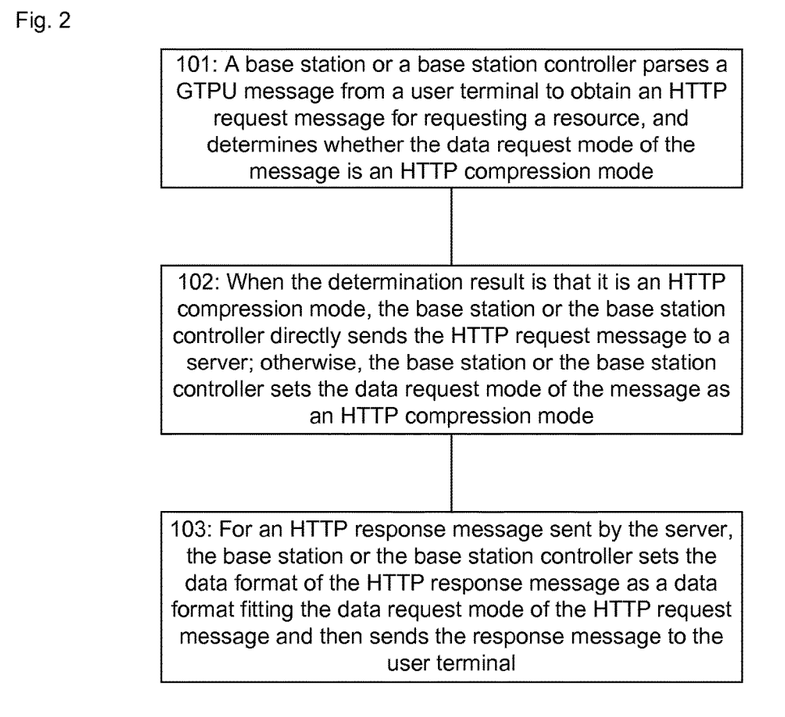
FIG. 2 shows a flowchart of a data distribution method based on HTTP compression provided by an embodiment of the disclosure.

FIG. 2 shows a flowchart of a data distribution method based on HTTP compression provided by an embodiment of the disclosure; as shown in FIG. 2, the method includes following steps:

Step 101: A base station or a base station controller parses a GRPS tunnelling protocol-User Plane message (i.e. GTPU message) from a user terminal, obtains an HTTP request message for requesting a resource, parses the HTTP request message, and determines whether the data request mode of the HTTP request message is an HTTP compression mode according to the data request mode obtained after parsing the HTTP request message;

Step 102: When the determination result is that it is an HTTP compression mode, the base station or the base station controller directly sends the HTTP request message to a server; otherwise, the base station or the base station controller sets the data request mode of the HTTP request message as an HTTP compression mode (that is, adding a compression attribute to the header of the message) and then sends the message to the server; and Step 103: For an HTTP response message sent by the server, the base station or the base station controller sets the data format of the HTTP response message as a data format fitting the data request mode of the HTTP request message and then sends the response message to the user terminal.

Specifically, after the base station or the base station controller receives the HTTP response message sent by the server, if the data request mode of the HTTP request message is an HTTP compression mode while the data format of the HTTP response message is an HTTP non-compression mode, the base station or the base station controller extracts the response data from the HTTP response message, compresses the data and then adds the compressed data to a new HTTP response message to send to the user terminal; if the data request mode of the HTTP request message is an HTTP non-compression mode while the data format of the HTTP response message is an HTTP compression mode, the base station or the base station controller extracts the response data from the HTTP response message, decompresses the data and then adds the decompressed data to a new HTTP response message to send to the user terminal; if the data request mode of the HTTP request message is an HTTP compression mode and the data format of the HTTP response message is an HTTP compression mode, the base station or the base station controller directly sends the HTTP response message to the user terminal; if the data request mode of the HTTP request message is an HTTP non-compression mode and the data format of the HTTP response message is an HTTP non-compression mode, the base station or the base station controller directly sends the HTTP response message to the user terminal.

Figure 3:
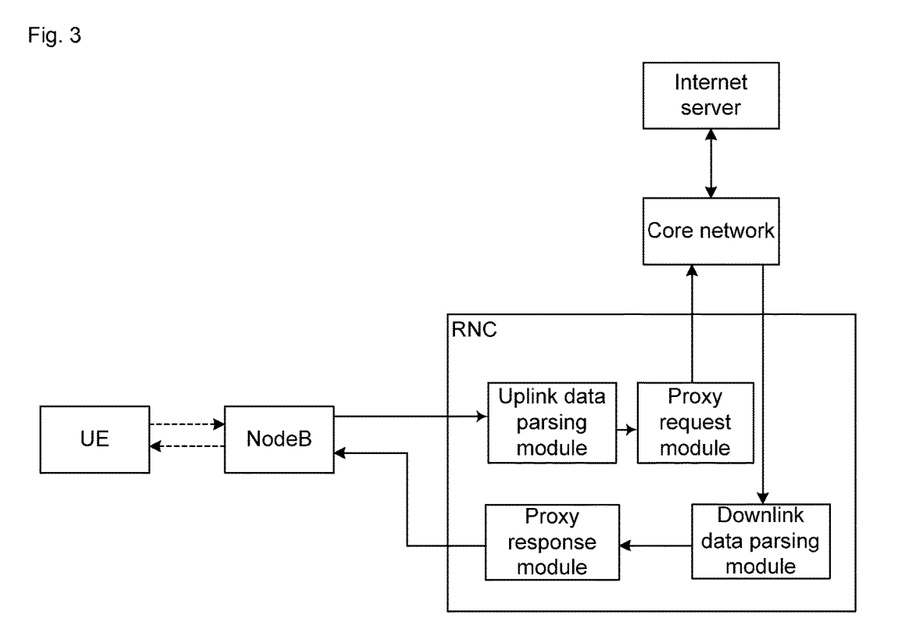
FIG. 3 shows a diagram of a data distribution device based on HTTP compression in 3G mode provided by an embodiment of the disclosure.

FIG. 3 shows a diagram of a data distribution device based on HTTP compression in 3G mode provided by an embodiment of the disclosure; as shown in FIG. 3, the data distribution device includes the following parts located at the side of the base station or the side of the base station controller:

an uplink data parsing module, which is configured to receive from a user terminal an HTTP request message for requesting a resource; specifically, the uplink data parsing module acquires a data packet in a GTPU message, removes a relevant GTPU header and extracts the HTTP request message therein;

a proxy request module, which is configured to: determine whether the data request mode of the HTTP request message is an HTTP compression mode; if it is determined that the data request mode of the HTTP request message is an HTTP compression mode, directly send the HTTP request message to a server; otherwise, modify the data request mode of the HTTP request message to be an HTTP compression mode and send the message to the server via a core network; that is to say, the proxy request module parses the extracted HTTP request message to check whether the HTTP request message supports a compression format; if the HTTP request message supports a compression format, the proxy request module directly sends the request message to the server; if the HTTP request message does not support a compression format, the proxy request module modifies the HTTP request message by a Transmission Control Protocol (TCP) transparent proxy, namely, adding a compression attribute to the request message forcedly, and then sends the HTTP request message to the server;

a downlink data paring module, which is configured to receive an HTTP response message sent by the server to respond to the HTTP request message; that is to say, the downlink data paring module mainly intercepts the data with which the server responds and extracts the HTTP response message therein;

a proxy response module, which is configured to set the data format of the HTTP response message as a data format fitting the data request mode of the HTTP request message and to send the HTTP response message to the user terminal; further, the proxy response module is configured to: if the data request mode of the HTTP request message is an HTTP compression mode while the data format of the HTTP response message is an HTTP non-compression mode, extract the response data from the HTTP response message, compress the response data and then add the compressed data to a new HTTP response message to send to the user terminal; if the data request mode of the HTTP request message is an HTTP non-compression mode while the data format of the HTTP response message is an HTTP compression mode, extract the response data from the HTTP response message, decompress the response data and then add the decompressed data to a new HTTP response message to send to the user terminal.

That is to say, the proxy response module implements processing in four ways as follows according to whether the data format in the extracted HTTP response message is a compression mode and whether the HTTP request requires compressed data: 1) if the request is in a compression mode and the response data is compressed, the proxy response module directly sends the downlink message to a sending queue; 2) if the request is in a compression mode and the response is not in a compression mode, the proxy response module extracts the data in the response message to send to a buffer, compresses the data, modifies the HTTP response message by a TCP transparent proxy, and adds the compressed data to a new response message to send to a sending queue; 3) if the request is in a non-compression mode and the response is in a compression mode, the proxy response module extracts the data in the response message to send to a buffer, decompresses the data, modifies the HTTP response message by a TCP transparent proxy, and adds the decompressed data to a new response message to send to a sending queue; 4) if the request is in a non-compression mode and the response data is not compressed, the proxy response module directly sends the downlink message to a sending queue.

Figure 4:
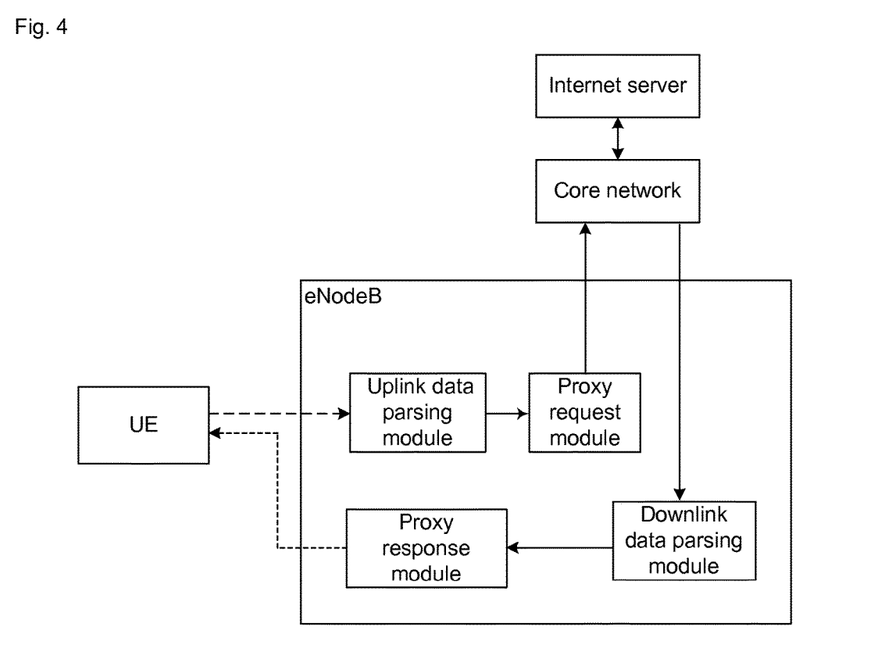
FIG. 4 shows a diagram of a data distribution system based on HTTP compression in 4G mode provided by an embodiment of the disclosure.

FIG. 4 shows a diagram of a data distribution system based on HTTP compression in 4G mode provided by an embodiment of the disclosure; as shown in FIG. 4, UE and an eNodeB communicate with each other via an air interface; in the disclosure, an uplink data parsing module provided at the side of a base station intercepts the data transmitted from the UE to the eNodeB to extract a GTPU message, and parses the GTPU message to extract an HTTP request message; a proxy request module parses the HTTP request message to check whether a compression mode is supported and performs relevant subsequent processing; a downlink data parsing module mainly acquires a data packet transmitted from a server and extracts an HTTP response message therein; the proxy response module mainly performs different operations according to whether the HTTP response message is in a compression format and whether the original HTTP request supports a compression format.

Figure 5:
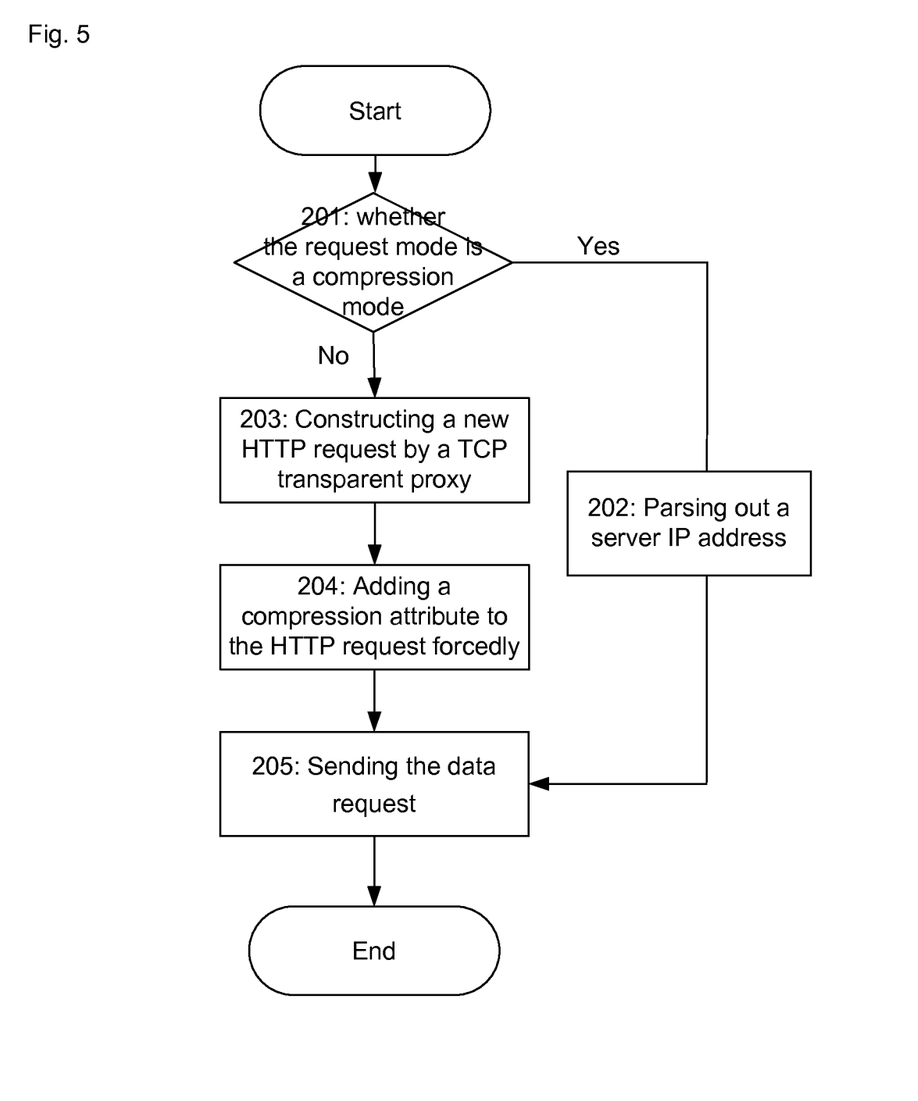
FIG. 5 shows a flowchart of a proxy requesting data distribution provided by an embodiment of the disclosure.

FIG. 5 shows a flowchart of a proxy requesting data distribution provided by an embodiment of the disclosure; as shown in FIG. 5, this process includes following steps:

Step 201: Extracting a URL in a user HTTP request and parsing the HTTP request message from the user; if the request message contains an attribute field "Accept-Encoding" or an attribute field "Content-Encoding", saving the attribute value to a global variable "QryCompressFormat", that is, determining whether the request mode is a compression mode; if it is a compression mode, going to Step 202; otherwise, going to Step 203;

Step 202: Parsing out a server IP address corresponding to the request according to the URL, so as to directly send a data request to the server if needed subsequently; going to Step 205;

Step 203: Constructing a new HTTP request message by a TCP transparent proxy;

Step 204: Adding a compression attribute "Accept-Encoding=gzip, deflate" to the header of the HTTP request message forcedly, so as to send a data request through a gzip compression format when subsequently sending the data request to the server; and Step 205: Sending the data request; and ending the process.

Figure 6:
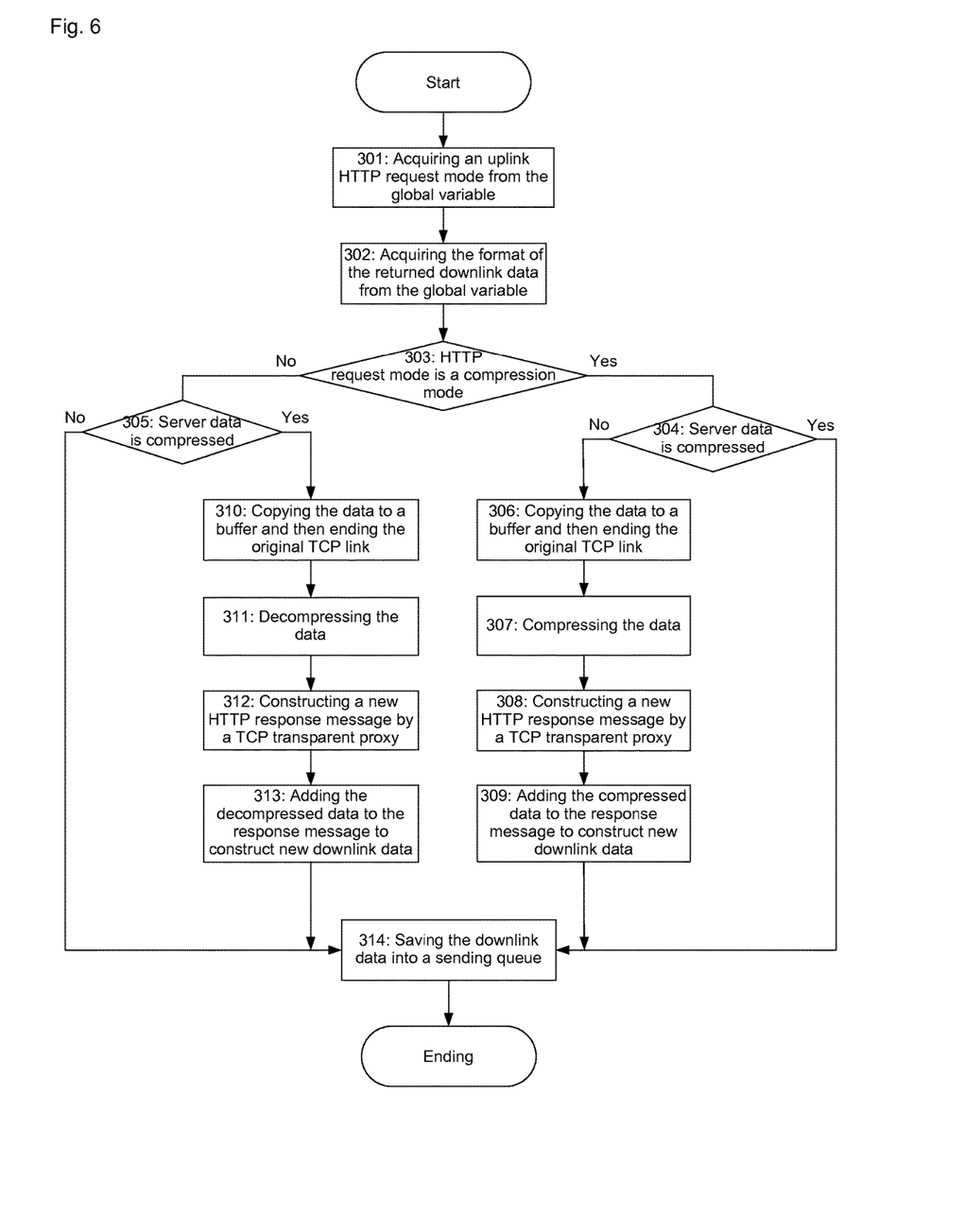
FIG. 6 shows a flowchart of a proxy responding to a data distribution request provided by an embodiment of the disclosure.

FIG. 6 shows a flowchart of a proxy responding to a data distribution request provided by an embodiment of the disclosure; as shown in FIG. 6, the process includes following steps:

Step 301: Extracting a user requested HTTP mode from a global variable "QryCompressFormat";

Step 302: Acquiring from the global variable the format of returned downlink data and extracting the format of a resource; parsing an HTTP response message sent by a server, if the response message contains an attribute field "Accept-Encoding" or an attribute field "Content-Encoding", it is indicated that the responded data format is of a compression mode; saving a value following the attribute field into the variable "AskCompressFormat", that is, a response data compression algorithm; otherwise, it is indicated that the responded data format does not support a compression mode;

Step 303: Determining the data request mode of the current user; if it is an HTTP compression mode, going to Step 304; otherwise, going to Step 305;

Sep 304: Determining the current resource format; if it is an HTTP compression mode, going to Step 314; otherwise, going to Step 306;

Step 305: Determining the current resource format; if it is an HTTP compression mode, going to Step 310; otherwise, going to Step 314;

Step 306: Acquiring the data in the downlink HTTP response message, and copying the data to a buffer and then ending the original TCP link;

Step 307: Compressing the data using a compression algorithm QryCompressFormat;

Step 308: Constructing a new HTTP response message by a TCP transparent proxy;

Step 309: Adding the compressed data to the new HTTP response message to construct new downlink data; going to Step 314;

for example, UE1 requests data in a Server through a compression mode, but the Server responds with uncompressed data. If the data with which the server responds is not compressed by the mode requested by the UE1 at the side of the base station using the method provided in the disclosure, more air interface bandwidth will be consumed when the data is sent to the UE1;

Step 310: Acquiring the data in the downlink HTTP response message, and copying the data to a buffer and then ending the original TCP link;

Step 311: Decompressing the data using a compression algorithm AskCompressForamt;

Step 312: Constructing a new HTTP response message by a TCP transparent proxy;

Step 313: Adding the decompressed data to the new HTTP response message to construct new downlink data; going to Step 314;

for example, UE2 requests data in a Server through a non-compression mode; if the request mode is not modified to a compression mode forcedly at the side of the base station using the method provided in the disclosure, the Server will respond with uncompressed data to the request and more backhaul bandwidth will be consumed when the data is transmitted from the core network to the base station; and Step 314: Outputting the downlink data to a sending queue; and ending the process.

Although a detailed description is given above, the disclosure is not limited to the description here. Those skilled in the art may make various modifications according to the principle of the disclosure; therefore, any modifications made according to the principle of the disclosure should fall into the scope of protection of the disclosure.

INDUSTRIAL APPLICABILITY

The embodiments of the disclosure determine whether the data request mode of a HTTP request message is an HTTP compression mode, directly sends the data request to a server if the data request mode is an HTTP compression mode, otherwise, sets the data request mode as an HTTP compression mode if the data request mode is not an HTTP compression mode and then sends the data request to the server; and the server returns compressed data. With the disclosure, the consumption of backhaul bandwidth and the consumption of air interface bandwidth can be significantly reduced.

What is claimed is:

1. A data distribution method, comprising:

parsing, by a base station or a base station controller, a General Packet Radio Service (GPRS) Tunnelling Protocol-User Plane (GTPU) message from a user terminal to obtain a Hyper Text Transport Protocol (HTTP) request message for requesting a resource, and determining, by the base station or the base station controller, whether a data request mode of the HTTP request message is an HTTP compression mode;

when a determination result is that the data request mode is an HTTP compression mode, directly sending, by the base station or the base station controller, the HTTP request message to a server; otherwise, when it is determined that the data request mode of the HTTP request message is not an HTTP compression mode, setting, by the base station or the base station controller, the data request mode of the HTTP request message as an HTTP compression mode by adding a compression attribute to a header of the HTTP request message, and then sending, by the base station or the base station controller, the HTTP request message in the HTTP compression mode to the server via a core network; and setting, by the base station or the base station controller, a data format of an HTTP response message sent by the server as a data format fitting the data request mode of the HTTP request message and sending, by the base station or the base station controller, the HTTP response message to the user terminal;

wherein the step of setting a data format of an HTTP response message sent by the server as a data format fitting the data request mode of the HTTP request message and sending the HTTP response message to the user terminal by the base station or the base station controller comprises:

when the data format of the HTTP response message sent by the server is an HTTP non-compression mode but the data request mode of the HTTP request message is an HTTP compression mode, extracting, by the base station or the base station controller, response data from the HTTP response message, compressing, by the base station or the base station controller, the response data, and then adding, by the base station or the base station controller, the compressed response data to a new HTTP response message to send to the user terminal.

2. The method according to claim 1, further comprising: determining, by the base station or the base station controller, whether the data request mode of the HTTP request message is an HTTP compression mode according to the data request mode obtained by parsing the HTTP request message.

3. A data distribution method, comprising:

parsing, by a base station or a base station controller, a General Packet Radio Service (GPRS) Tunnelling Protocol-User Plane (GTPU) message from a user terminal to obtain a Hyper Text Transport Protocol (HTTP) request message for requesting a resource, and determining, by the base station or the base station controller, whether a data request mode of the HTTP request message is an HTTP compression mode;

when a determination result is that the data request mode is an HTTP compression mode, directly sending, by the base station or the base station controller, the HTTP request message to a server; otherwise, when it is determined that the data request mode of the HTTP request message is not an HTTP compression mode, setting, by the base station or the base station controller, the data request mode of the HTTP request message as an HTTP compression mode by adding a compression attribute to a header of the HTTP request message, and then sending, by the base station or the base station controller, the HTTP request message in the HTTP compression mode to the server via a core network; and setting, by the base station or the base station controller, a data format of an HTTP response message sent by the server as a data format fitting the data request mode of the HTTP request message and sending, by the base station or the base station controller, the HTTP response message to the user terminal;

wherein the step of setting a data format of an HTTP response message sent by the server as a data format fitting the data request mode of the HTTP request message and sending the HTTP response message to the user terminal by the base station or the base station controller comprises:

when the data format of the HTTP response message sent by the server is an HTTP compression mode but the data request mode of the HTTP request message is an HTTP non-compression mode, extracting, by the base station or the base station controller, response data from the HTTP response message, decompressing, by the base station or the base station controller, the response data, and then adding, by the base station or the base station controller, the decompressed response data to a new HTTP response message to send to the user terminal.

4. The method according to claim 3, further comprising: determining, by the base station or the base station controller, whether the data request mode of the HTTP request message is an HTTP compression mode according to the data request mode obtained by parsing the HTTP request message.

5. A data distribution device, comprising:
a processor; and
a memory for storing instructions executable by the processor;
wherein the processor is configured to:
receive from a user terminal a Hyper Text Transport Protocol (HTTP) request message for requesting a resource;
determine whether a data request mode of the HTTP request message is an HTTP compression mode; when it is determined that the data request mode of the HTTP request message is an HTTP compression mode, directly send the HTTP request message to a server; otherwise, modify the data request mode of the HTTP request message to be an HTTP compression mode by adding a compression attribute to a header of the HTTP request message, and send the HTTP request message in the HTTP compression mode to the server via a core network;
receive an HTTP response message sent by the server to respond to the HTTP request message; and
set a data format of the HTTP response message as a data format fitting the data request mode of the HTTP request message and to send the HTTP response message to the user terminal;
when the data request mode of the HTTP request message is an HTTP compression mode but the data format of the HTTP response message is an HTTP non-compression mode, extract response data from the HTTP response message, compress the response data and then add the compressed response data to a new HTTP response message to send to the user terminal.

6. A data distribution device, comprising:
a processor; and
a memory for storing instructions executable by the processor;
wherein the processor is configured to:
receive from a user terminal a Hyper Text Transport Protocol (HTTP) request message for requesting a resource;
determine whether a data request mode of the HTTP request message is an HTTP compression mode; when it is determined that the data request mode of the HTTP request message is an HTTP compression mode, directly send the HTTP request message to a server; otherwise, modify the data request mode of the HTTP request message to be an HTTP compression mode by adding a compression attribute to a header of the HTTP request message, and send the HTTP request message in the HTTP compression mode to the server via a core network;
receive an HTTP response message sent by the server to respond to the HTTP request message; and
set a data format of the HTTP response message as a data format fitting the data request mode of the HTTP request message and to send the HTTP response message to the user terminal;
when the data request mode of the HTTP request message is an HTTP non-compression mode but the data format of the HTTP response message is an HTTP compression mode, extract response data from the HTTP response message, decompress the response data and then add the decompressed response data to a new HTTP response message to send to the user terminal.

* * * * *